(12) United States Patent
Thottathil et al.

(10) Patent No.: US 11,549,021 B2
(45) Date of Patent: Jan. 10, 2023

(54) FORMULATION AND METHODS FOR COATING METAL SURFACES

(71) Applicant: Winamac Coil Spring, Inc., Kewanna, IN (US)

(72) Inventors: Paul Thottathil, New Hyde Park, NY (US); John M. Ryan, Bellmore, NY (US); Purushothaman Kesavan, Franklin Square, NY (US); Satyabrata Mukherjee, Westbury, NY (US)

(73) Assignee: Winimac Coil Spring, Inc., Kewanna, IN (US)

( * ) Notice: Subject to any disclaimer, the term of this patent is extended or adjusted under 35 U.S.C. 154(b) by 289 days.

(21) Appl. No.: 17/036,052

(22) Filed: Sep. 29, 2020

(65) Prior Publication Data

US 2021/0017397 A1    Jan. 21, 2021

Related U.S. Application Data

(63) Continuation of application No. 16/182,095, filed on Nov. 6, 2018, now Pat. No. 10,793,724.

(60) Provisional application No. 62/722,334, filed on Aug. 24, 2018, provisional application No. 62/583,077, filed on Nov. 8, 2017.

(51) Int. Cl.
| | | |
|---|---|---|
| *C09D 5/08* | (2006.01) |
| *C09D 163/00* | (2006.01) |
| *C09D 167/08* | (2006.01) |
| *C08G 59/62* | (2006.01) |
| *C09D 4/06* | (2006.01) |
| *C08L 63/00* | (2006.01) |
| *C08G 59/40* | (2006.01) |

(52) U.S. Cl.
CPC ............ *C09D 5/08* (2013.01); *C08G 59/4021* (2013.01); *C08G 59/621* (2013.01); *C08L 63/00* (2013.01); *C09D 4/06* (2013.01); *C09D 163/00* (2013.01); *C09D 167/08* (2013.01)

(58) Field of Classification Search
CPC ...... C09D 5/08; C09D 163/00; C09D 167/08; C09D 4/06; C08G 59/4021; C08G 59/621; C08L 63/00
USPC ........................................................ 524/868
See application file for complete search history.

(56) References Cited

U.S. PATENT DOCUMENTS

| | | |
|---|---|---|
| 4,107,228 A | 8/1978 | Horowitz et al. |
| 4,421,569 A | 12/1983 | Dichter et al. |

OTHER PUBLICATIONS

International Search Report and Written Opinion issued in related PCT application No. PCT/US2018/059723, dated Feb. 1, 2019.
Non-Final Office Action, dated Apr. 29, 2020 in U.S. Appl. No. 16/182,095, filed Nov. 6, 2018.
Amendment and Response filed with U.S. Patent and Trademark Office in U.S. Appl. No. 16/182,095, filed Nov. 6, 2018.

*Primary Examiner* — Hui H Chin

(74) *Attorney, Agent, or Firm* — Barnes & Thornburg LLP; Scott D. Rothenberger

(57) ABSTRACT

Compositions and methods are described which provide a protective coating to coils or springs via a polymerization process such as by covalent bonding that includes grafting to the metal surface.

20 Claims, No Drawings

FORMULATION AND METHODS FOR COATING METAL SURFACES

CROSS REFERENCE TO RELATED APPLICATIONS

This is a continuation of application Ser. No. 16/182,095, filed Nov. 6, 2018 and entitled FORMULATION AND METHODS FOR COATING METAL SURFACES and claims priority to Provisional Application Ser. No. 62/583,077, filed Nov. 8, 2017 and entitled FORMULATION AND METHODS FOR COATING METAL SURFACES and Provisional Application Ser. No. 62/722,334, filed Aug. 24, 2018 and entitled FORMULATION AND METHODS FOR COATING METAL SURFACES, the entire contents of which are incorporated herein by reference.

FIELD OF THE INVENTION

The invention relates generally to coating compositions for application onto carbon steel to provide chemical resistance, abrasion resistance and/or corrosion resistance for use in the manufacture of springs.

BACKGROUND OF THE INVENTION

Many types of metals are employed to produce articles of manufacture and other useful objects. Many of these metals are well known to degrade, i.e., oxidize, corrode, or rust, when exposed to air, corrosive gases or vapors, moisture, galvanic potential and/or from other such environmental causes. In particular, ferrous metals, such as carbon steel, are especially prone to rust unless protected from air and moisture. Often corrosion-prone metals are coated with a film or layer of oil, grease, water resistant paint, polymer film, or other barrier in order to prevent air and/or moisture from contacting the steel.

However, previously known compositions and methods of protection suffer from a number of drawbacks, including costs associated with materials and processing steps, interference by such protective coatings with subsequent manufacturing steps and/or the protective coating not remaining attached to protect the metal surface during use.

Some articles that are painted or coated to prevent rust during storage and transport are then subjected to cutting, welding, joining and further painting or coating processes. Application of welding or cutting torch temperatures to currently available coatings may release toxic fumes. Further, the protective coating and/or a burned coating residue can interfere with welding or other forms of joining of the heated sections, and interfere with the adhesion of further paints or coatings applied during manufacture for cosmetic or protective purposes.

Consequently, compositions and methods are sought to protect corrosion-prone metals with an easy to apply, protective coating composition that provides effective long-term corrosion protection, abrasion resistance and/or chemical resistance for metals throughout the useful life of any metal object or article of manufacture.

Therefore, a need exists for compositions and methods that overcomes one or more of the current disadvantages noted above for long term corrosion protective coatings, chemical resistant coatings and/or abrasion resistant coatings that are applied to metal articles, including carbon steels.

BRIEF SUMMARY OF THE INVENTION

The embodiments described herein pertain to polymeric compositions for application onto carbon steel parts for chemical resistance, abrasion resistance and/or corrosion resistance. Usually carbon steel doe s no t have chemical resistance, abrasion resistance and/or cot iosion resistance to environmental forces. The coatings described herein utilize chemical grafting that involves the use of prepolymer(s), monomer(s), catalyst(s), graft initiator(s), wetting agent(s), filler(s) and other additives. The coating(s) applied onto the carbon steel surface via graft polymerization, form a polymer film that is chemically attached to the substrate. For example, the carbon steel substrate is reacted with graft initiators which create reaction sites on the substrate via a free radical mechanism. This in turn renders the substrate receptive to attachment of monomers/prepolymers to form a polymeric film which is chemically bonded (e.g., a covalent bond) to the substrate having desired properties in terms abrasion wear, chemical resistance and/or corrosion resistance as well as other properties.

The present embodiments surprisingly provide coatings to carbon steel surfaces that are robust to environmental effects, such as abrasion, chemicals and corrosion. Not to be limited by theory, it is believed that the reaction that takes place at the interface of the carbon steel surface and compositions described herein, is a covalent coupling of an oxidized surface with a reactive group of the monomer and/or prepolymer, e.g., a acrylate, methacrylate or epoxy group. The resulting reaction between the surface of the metal and the reactive molecule results in a coating that is considered a "graft".

Accordingly, the present embodiments provide compositions and methods for graft modifying or coating the surfaces of metals, including ferrous metals such as carbon steels. The inventive grafting process employs polyfunctional monomers/prepolymers, such as, for example, vinyl monomers, urethane and epoxy prepolymers which are chemically bonded to the metal surface by the grafting process provided herein. In one aspect, urethane monomers and/or epoxy prepolymers are employed.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

The present embodiments provide coating formulations for metal springs for superior chemical, water and/or corrosion resistance. The embodiments are based on covering the metal springs with a protective coating by chemically organic monomers and prepolymers to the surface of the metal thereby forming a strongly bonded film to the metal substrate (attachment to the surface, e.g., via grafting). The monomers/prepolymers are so selected that the polymer film adhered onto the metal springs have excellent chemical, abrasive and/or corrosion resistance. The polyfunctional monomers and prepolymers are vinyl monomers, methacrylate monomers, epoxy prepolymers, phenolic prepolymers, acrylic prepolymers and fluoropolymers which are believed to be chemically bonded to the metal substrate via hydroxyl oxygen of the metal hydroxide. The monomers are vinyl epoxy acrylic, vinyl acrylic or urethane having one or more hydroxyl, carboxyl, epoxy or glycidyl groups.

It should be understood that throughout the specification, the term "acrylate" is used. As used herein, the term "acrylate" includes both acrylates and methacrylates and should be considered interchangeable. Where "acrylate" is noted, that includes "methacrylate" and when "methacrylate" is noted, that also includes "acrylate".

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

The embodiments described herein provide compositions and methods for covalently grafting a polymer or polymers to a substrate. Such grafting involves the "activation" of a substrate to convert some part of the substrate surface into moieties able to covalently bond to one or more supplied monomer, prepolymer or polymer reagents placed in contact with the substrate surface. Activation requires a graft initiator and/or activator, which not to be limited by theory, typically removes hydrogens linked to surface functional groups, producing active moieties ready to covalently bond to a provided reagent. Such hydrogen moieties are found, e.g., in most organic materials. For grafting coatings onto metals or other non-organic materials, hydroxyl moieties present as part of trace surface oxidation are thought to provide a site for surface activation of such non-organic substrates.

Polymer coatings according to the embodiments described herein provide treated substrates with a variety of desirable properties. These include, for instance, resistance to corrosion, abrasion, atmospheric corrosive gases or vapors, e.g., hydrogen sulfide, carbon dioxide, sulfur dioxide, nitrous oxide, at relative humidity of 90% or more, and ambient conditions of temperature and pressure. The polymer coating is produced by applying a composition that includes suitable monomers, prepolymers, a graft-initiator, a polymerization initiator or catalyst, and other more conventional additives for appearance and long term stability. These and other features of the embodiments are described in further detail, below.

The term "substrate" as employed herein includes any object or article of manufacture that is coated with the compositions according to the embodiments described herein, e.g. providing a grafted coating. Suitable substrates include objects, articles of manufacture, and the like, composed of any metal, and particularly a metal or metals needing corrosion protection, as well as mixtures, composites, and alloys thereof. Exemplary metals include iron, copper, brass, aluminum, silver, and the like.

The definition of a substrate further includes a metallic object or article of manufacture in need of corrosion protection and is not intended to exclude optional nonmetallic objects or articles of manufacture, or optional metal objects or articles of manufacture that can be inherently corrosion resistant. Such nonmetallic substrates and/or corrosion resistant metals can be coated with the inventive compositions for purposes not related to corrosion protection, e.g., decoration, and/or can be coated, e.g., grafted, with the inventive composition while connected to and/or part of an object or article of manufacture that also includes metals needing corrosion protection.

Coated substrates, such as graft coated substrates, and related objects according to the embodiments described herein, can be used in, e.g., general industry, consumer products, the building trades, municipal water supply and waste water systems, ocean platforms, e.g., offshore oil and gas platforms, and ship building. In one particular aspect, the objects are coils or springs.

Most commonly, the substrate is a ferrous metal, such as steel, e.g., one of many art-known grades of carbon steel that are prone to corrosion unless coated or otherwise protected from air and moisture. Other metals that can be protected from corrosion by the inventive composition include, simply by way of example, copper, brass, aluminum, silver, and so forth. These later metals corrode and fail at an accelerated rate when exposed to certain types of acid, alkali, or strong oxidizers, e.g., in the form of vapors, mists or solutions.

The grafting solution can be prepared in two parts for convenience and storage stability. These are designated as Part A and Part B. Part A includes, for example, the majority of the active components including a graft initiator and a catalyst, and Part B includes a silica based agent, optionally mica, zinc phosphate and Teflon like materials. The full or final grafting solution is prepared prior to use by mixing Part B with Part A in a fixed ratio. The formulation thus prepared is then stirred for uniformity and is applied onto a substrate to be coated, by any art-known method.

Part A of the grafting solution is prepared in a solvent compatible with the reagents selected for grafting. In one aspect, this forms a solution, suspension and/or dispersion when combined with components of Part A. Solvents are selected depending on the prepolymer and/or monomers employed, and can include compatible polar solvents such as water soluble alcohols, ketones, ethers, esters, and derivatives and mixtures thereof, and other readily available solvents.

Initiators, such as graft initiators ("GI") are metal ions including, for example, iron, silver, cobalt, copper, cerium, and/or combinations thereof, or any other art-known graft initiator. As exemplified herein, silver ion is employed. The graft initiators are employed in a concentration ranging from about 0.01 to about 1.0%, and more particularly in a concentration ranging from about 0.001 to about 0.1% by weight, relative to the weight of prepolymer or monomer(s) present. For example, the graft initiator can be silver perchlorate (i.e., $AgClO_4$), silver nitrate (i.e., $AgNO_3$) or ferrous ammonium sulfate (i.e., $(NH_4)_2Fe(SO_4)_2$). In one aspect, silver perchlorate (0.1% in toluene) is utilized.

Catalysts (also art-known as polymerization initiators) are suitable peroxides ("ROOR"), wherein R is H or any organic moiety compatible with the desired grafting reaction. Peroxide catalysts include, for example, hydrogen peroxide and any organic peroxide, such as, e.g., benzoyl peroxide, methyl ethyl ketone peroxide, 1-butyl hydroperoxide and derivatives and combinations thereof. The peroxide catalysts are generally employed in a concentration ranging from about 0.1 to about 5%, or greater of the total weight of the composition. More particularly, the peroxide catalysts are employed in a concentration ranging from about 0.05 to about 1.0% (by weight relative to the solution weight). For example, methyl ethyl ketone peroxide (0.1% solution in toluene) can be utilized.

Another example of a peroxide is urea peroxide, often supplied as a 1 percent by weight in solution.

Prepolymers and/or monomers, are employed in the grafting solution in a concentration ranging from about 0.1 to about 80%, by weight, relative to the solution. More particularly, the prepolymers and/or monomers are employed in a concentration ranging from about 0.1 to about 50%, by weight or more, and in certain embodiments, are optionally employed in a concentration ranging from about 0.1 to about 20%, by weight, relative to the grafting solution.

Part A of the graft coating solution includes monomers or prepolymers, for example, vinyl monomers, methacrylate monomers, epoxy prepolymers, phenolic prepolymers (such as phenolic/formaldehyde prepolymers), acrylic prepolymers, melamine/formaldehyde prepolymers, and alkyd prepolymers. Part A also includes fluoropolymers, such as LUMIFLON®. Part A can also include one or more solvent(s), urea(s), tinting agent(s), surfactant(s) (both fluorosurfactant(s) and ether based surfactant(s)), silane(s), peroxide(s), graft initiator(s) and other catalyst(s).

Monomers and/or prepolymers and/or fluoropolymers are employed in Part A of the graft coating formulation in a concentration ranging from about 20 to 80 percent by weight of Part A and more particularly in a concentration ranging from about 30 to about 75 percent by weight of Part A and even more particularly from about 5 to about 30 percent by weight of Part A, and more particularly from about 5 to about 20 percent by weight of Part A.

Each monomer, prepolymer or polymer can individually be present from about 1 to about 50 percent by weight, more particularly from about 2 to about 40 percent by weight, even more particularly from about 5 to about 30 percent by weight, more particularly from about 10 to about 20 percent by weight and all ranges included there between based on the total weight of Part A.

In one aspect, polyurethanes are not included in the compositions of the present embodiments.

Epoxy prepolymers, such as phenoxy resin, include, for example, bisphenol A diglycidyl ethers (often abbreviated as DGEBPA or DGEBA), such as epoxy prepolymers (EPON™ 1007 (Momentive), ARALDITE® 488 N-40 (Huntsman Advanced Materials), D.E.R.™ 684-40 (Dow) or EPONOL™ 53, an ultra-high molecular weight epoxy resin that is generally dissolved in methyl ethyl ketone and/or propylene glycol methyl ether. Generally, the epoxy value of the prepolymer has a minimum value of 3500.

Phenoxy resins are thermoplastic polymers derived from bisphenol A (($CH_3$)$_2$C($C_6H_4$OH)$_2$) and the epoxy, epichlorohydrin (Cl—$CH_2$—($C_2H_3$O)). From its starting materials, phenoxy resins may be classified as a polyepoxy, but after reactions during polymerization, the resin has virtually no epoxide functional groups remaining. As such, phenoxy resins can be classified as a polyether due to the chain of ether functional groups across its backbone. Alcohol functional groups are also present, allowing for further modifications with cross-linking reactions with isocyanates, anhydrides, or other chemicals. Phenoxy resins have the following basic repeating form:

The molecular weight of phenoxy resins depends on the ratio of bisphenol A to epichlorohydrin during reaction. If two equivalents of epichlorohydrin to bisphenol A are used, the reaction ends with the diepoxy molecule, bisphenol A diglycidyl ether (DGEBA, ($CH_3$)$_2$C($C_6H_4$—O—$CH_2$($C_2H_3$O))$_2$). To create polymerization, the equivalents of epichlorohydrin is decreased, allowing for other unreacted bisphenol A alcohol groups to react with the epoxy functional groups, creating a chain. A phenoxy resin is formed when these conditions are modified to create a high molecular weight polymer around 30,000-70,000 g/mol. Phenoxy resins are transparent and are soluble in methyl ethyl ketone.

Other properties of phenoxy resins vary by formulation, with melt indexes at 200° C. (392° F.) ranging from 4-70 g/10 min and glass transition temperatures ranging from 80-100° C. (176-212° F.). A suitable bisphenol A epoxy resin is Epirez 3520 WY55 (Hexion). For example, Gabriel Phenoxy PKTMHW-35 (GabrielChem.com) is a waterborne anionically-stabilized colloidal dispersion of phenoxy resin PKHH. PKHH has a molecular weight (Weight Average, Daltons) of about 52,000 and an OH Equivalent Weight (g/equiv.) of about 280. PKHW-35 is a colloidal dispersion with butyl cellosolve, (Glycol Ether EB) and dimethylethanolamine.

Suitable ranges for epoxy prepolymers for the embodiments described herein include from about 1 percent to about 50 percent by weight based on the total weight of the composition and all ranges and values inclusive of the range, including 2 to 40, 5 to 30, 25 to 35, 10 to 25, 25 to 40, 25 to 50, 10 to 40, etc.

Alkyd prepolymers include those prepared by reacting a monobasic fatty acid, fatty ester or naturally occurring-partially saponified oil; a glycol or polyol; and a polycarboxylic acid. Suitable alkyd prepolymers include, for example, KELSOL® 3964 BG 70 (Reichhold Chemical, Inc.).

Suitable ranges for alkyd prepolymers for the embodiments described herein include from about 1 percent to about 50 percent by weight based on the total weight of the composition and all ranges and values inclusive of the range, including 2 to 40, 5 to 30, 10 to 25, 1 to 5, 1 to 10, 1 to 15, etc.

Melamine prepolymers include, for example, (CYMEL® 303 (Cytec), RESIMENE® (INEOS Melamines). CYMEL® is a highly methylated, monomeric melamine crosslinker supplied in liquid form at >98% solids content.

Suitable ranges for melamines for the embodiments described herein include from about 0.1 percent to about 20 percent by weight based on the total weight of the composition and all ranges and values inclusive of the range, including 0.5 to 20, 1 to 20, 2 to 15, 5 to 10, 1.5 to 4, 0.1 to 5, 0.2 to 5, 0.3 to 5, 0.4 to 5, 0.5 to 5, 0.1 to 7, 0.2 to 7, 0.3 to 7, 0.4 to 7, 0.5 to 7, etc. Phenol prepolymers are reaction products of phenol or substituted phenols with formaldehyde and include, for example, PHENODUR® PR 285/55-1B, PHENODUR® PR 521/60B (Allnex), SANTOLINK® EP 560 and phenoxy resins of InChemRez Chemicals "Phenoxy resins" that are polyhydroxyethers having terminal alpha-glycol groups with weight average molecular weight range of from approximately 25,000 to about 60,000.

Phenol/formaldehyde resins include S antolink butyl etherified phenol formaldehyde crosslinker resin, (CAS No. 96446-41-2).

Suitable ranges for phenol/formaldehyde prepolymers for the embodiments described herein include from about 1 percent to about 50 percent by weight based on the total weight of the composition and all ranges and values inclusive of the range, including 2 to 40, 5 to 30, 10 to 25, 1 to 5, 1 to 10, 1 to 15, etc.

Fluoropolymers include, for example, fluoroethylene and alkyl vinyl ether resins (FEVE), such as those known as LUMIFLON® (AGC Chemicals Company), e.g., LUMIFLON® LF 9716. Alternatively, KYNAR® PVDF solubilized in methyl ethyl ketone or toluene can be utilized as well.

Suitable ranges for fluoropolymers for the embodiments described herein include from about 0.1 percent to about 20 percent by weight based on the total weight of the composition and all ranges and values inclusive of the range, including 0.5 to 20, 1 to 20, 2 to 15, 5 to 10, 1.5 to 4, etc.

Silicon-based monomers and/or prepolymers are optionally employed in Part A of the grafting solution. Desirable silicon-based monomers or prepolymers are generally dispersible or otherwise miscible in the solvent of Part A. Suitable silicon polymers or prepolymers are generally silane derivatives, including alkoxysilanes, dialkoxysilanes and trialkoxysilanes, such as the trimethoxysilanes, and epoxy silane esters.

For example, gamma-glycidoxypropyltrimethoxysilane, is commercially available as SILQUEST™ A-187 (Momentive) as well as SILQUEST™ A-1100, which is a gamma-aminopropyltriethoxysilane.

Suitable ranges for epoxy silanes, e.g., gamma-trialkoxysilanes for the embodiments described herein include from about 0.1 percent to about 2 percent by weight based on the total weight of the composition and all ranges and values inclusive of the range, including 0.1 to 2, 0.5 to 2, 0.5 to 0.9, 0.1 to 0.75, 0.2 to 0.5, 0.1 to 1, 0.2 to 1, 0.5 to 1, 0.5 to 1.5, 0.7 to 1.7, etc.

CoatOSil silanes are included, such as CoatOSil 1770 silane (Momentive) which is a cycloaliphatic epoxy silane,

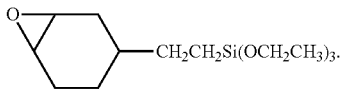

Such wetting agents are often employed in a concentration ranging from about 0.05 to about 0.10 percent, by weight of Part A, and more particularly from about 0.06 to about 0.07 percent, by weight of Part A.

Suitable ranges for silicone containing polymers/prepolymers for the embodiments described herein include from about 0.1 percent to about 2 percent by weight based on the total weight of the composition and all ranges and values inclusive of the range, including 0.1 to 1, 0.5 to 1, 0.5 to 0.9, 0.1 to 0.75, 0.2 to 0.5, etc.

Silane derivatives are generally added to Part A of the grafting solution in a concentration ranging from about 0.10 percent to about 0.50 percent by weight of Part A. More particularly, silane derivatives are added to Part A of the grafting solution in a concentration ranging from about 0.20 to a about 0.40 percent by weight of Part A.

Acid catalysts can be included in Part A. Suitable acid catalysts include, for example, strong acid catalysts based on dodecylbenezene sulfonic acid (DDBSA), e.g., (NACURE® 5076, supplied at 70% in isopropyl alcohol (King Industries Specialty Chemicals)) or those based on paratoluene sulfonic acid (PTSA).

Exemplary ranges for strong acid catalysts for the embodiments described herein include from about 0.1 percent to about 5 percent by weight based on the total weight of the composition and all ranges and values inclusive of the range, including 0.5 to 3, 1.5 to 2.5, 1.5 to 2, etc.

Catalysts, such as peroxides, include for example alkyl-alkyl peroxides as described above. In one embodiment, the catalyst includes methyl ethyl ketone peroxide supplied as a 0.1% solution in toluene.

In another embodiment, suitable inorganic or organic dyes or pigments that impart a marking color are mixed into the grafting solution or covalently linked by art-known methods to one or more of the components of the liquid composition. Suitable colorants for this purpose include, simply by way of example, TINT-AYD® ST colorants, (e.g., CW 5317, ST8317, tinting black) and/or combinations thereof, that are commercially available, for example, from Elementis Specialties, Inc. Colorants from Reitech Corporation, Dominion Color or Arbor Colorants are also suitable for use in the formulations described herein.

Exemplary ranges for dyes, pigments, tints, colorants, etc. for the embodiments described herein include from about 1 percent to about 20 percent by weight based on the total weight of the composition and all ranges and values inclusive of the range, including 5 to 15, 5 to 10, 1 to 5, 3 to 8, 1 to 10, 2 to 10, 3 to 10, 1 to 15, 2 to 15, 3 to 15, 4 to 15, 5 to 15, etc.

Suitable solvents for both Part A and Part B include, for example, ketones, such as acetone, methyl ethyl ketone, alkyl ethers, such as diethylene glycol monobutyl ether (D-B solvent, (Eastman)), toluene, etc.

Exemplary ranges for solvents for the embodiments described herein include from about 1 percent to about 50 percent by weight based on the total weight of the composition and all ranges and values inclusive of the range, including 2 to 40, 5 to 30, 10 to 25, 10 to 20, etc.

When water is used as a solvent or in combination with other solvents, the water can be unpurified (tap water) or deionized water.

Exemplary ranges for water, where water is the main solvent, for the embodiments described herein include from about 15 percent to about 40 percent by weight based on the total weight of the composition and all ranges and values inclusive of the range, including 15 to 25, 20 to 25, 25 to 30, 20 to 30, 20 to 40, 30 to 40, 25 to 40, etc.

Exemplary ranges for water, where water is present in combination with a second solvent, for the embodiments described herein include from about 25 percent to about 35 percent, by weight based on the total weight of the composition and all ranges and values inclusive of the range including 25 to 30, 30 to 35, 27 to 33, etc. and where the nonaqueous solvent is present from about 10 percent to about 25 percent by weight based on the total weight of the composition and all ranges and values inclusive of the range, including 15 to 20, 10 to 15, 15 to 25, etc.

Suitable fluorosurfactants include, for example, nonionic polymeric fluorochemical surfactants such as the "FC" surfactants available from Minnesota Manufacturing and Mining (3M), including FC4430 as a 2% solution in toluene, that are generally perfluorinated alkylated substances that include a terminal sulfonic acid, sulfonate or carboxylic acid or salt thereof. These are referred to as PFSAs (perfluorinated alkylated substances). Examples include, but are not limited to, perfluorooctanoic acid (PFOA), perfluorooctane sulfonate (PFOS), perfluorohexane sulfonic acid (PFHxS), perfluorononanoic acid (PFNA), perfluorodecanoic acid (PFDA) or mixtures of two of more PFSAs.

Suitable ranges for fluorinated nonionic surfactants (fluorosurfactants) for the embodiments described herein include from about 0.05 percent to about 2 percent by weight based on the total weight of the composition and all ranges and values inclusive of the range, including 0.05 to 1, 0.1 to 1, 0.5 to 1, 0.5 to 0.9, 0.1 to 0.75, 0.2 to 0.5, etc.

Suitable non-fluorinated surfactants include, for example, nonionic surfactants that have a hydrophilic polyethylene oxide chain and an aromatic hydrocarbon lipophilic or hydrophobic group such as in the TRITON™ family (Dow Chemical Company). For example, TRITON™ X-100, t-octylphenoxypolyethoxyethanol, is a suitable surfactant.

Suitable ranges for non-fluorinated nonionic surfactants for the embodiments described herein include from about 0.1 percent to about 5 percent by weight based on the total weight of the composition and all ranges and values inclusive of the range, including 0.1 to 5, 0.5 to 5, 0.5 to 0.9, 0.1 to 0.75, 0.2 to 0.5, 1 to 2, 2 to 3, 3 to 4, 4 to 5, 1.1 to 5, 1.2 to 5, 2.1 to 5, 2.2 to 5, 3.1 to 5, 3.2 to 5, 4.1 to 5, 4.2 to 5, 1.1 to 2, 1.2 to 2, 1.1 to 3, 1.2 to 3, 2.1 to 3, 3.1 to 4, 4.1 to 5, etc.

Urea and urea based agents can also be included in the Part A formulation as accelerators for curing of the epoxy component(s). For example, a suitable urea comprises dimethyl urea or a dimethyl urea such as 1,1-dialkyl-3-arylureas, where the aromatic can be substituted or unsubstituted, or else is hydrogenated, 3,3'-(4-methlyl-1,3-phenylene) bis (1,1-dimethylurea).

Exemplary ranges for accelerators for the embodiments described herein include from about 0.1 percent to about 5 percent by weight based on the total weight of the composition and all ranges and values inclusive of the range, including 0.5 to 3, 1.5 to 2.5, 1.5 to 2, etc.

Polyester prepolymers can be included in the embodiments described herein and include, for example, triesters of acetoacetate. For example, K-FLEX XMB-301 (available from King Industries in Norwalk, Conn.) is a tri-acetoacetate functional ester. Eastman WD-30 (Eastek 1000) is a sulfopolyester similar to Polymer D disclosed in Example 2, U.S. Pat. No. 3,734,874, the contents of which are included herein in their entirety. Eastek polymers are sulfopolyesters, having 5-sodiosulphonyl isophthalic acid residues with a Tg of from about 30 to 35° C.

Exemplary ranges for polyester prepolymers for the embodiments described herein include from about 5 percent to about 35 percent by weight based on the total weight of the composition and all ranges and values inclusive of the range, including 8 to 15, 15 to 25, 10 to 35, 15 to 20, 15 to 30, 8 to 20, 8 to 15, 8 to 17, 5.1 to 35, 5.2 to 35, 6.1 to 35, 6.2 to 35, 5.1 to 30, 5.2 to 30, 6.1 to 30, 6.2 to 30, etc.

Polybutadiene epoxidized polymers can be included in the embodiments described herein and include, for example, multifunctional, hydroxyl terminated, epoxidized poybutadiene resins, such as for example, Poly bd 600E or Poly bd 605E from Cray Valley. Such polybutadiene epoxidized polymers have a general formula of:

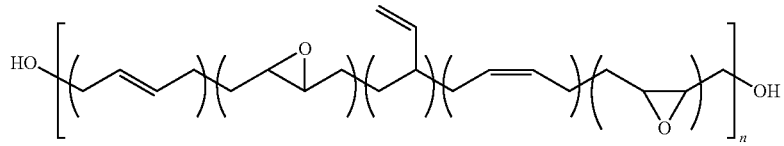

Typical resin properties include epoxy value in milliequivalents/gram (meq/g) of 2 to 4, epoxy equivalent weight of 260 to 500, oxygen % of from 3.4 to about 6.2, a viscosity of 7000 or 22000 and hydroxyl value (meq/g) of about 1.7 to about 1.74 with a molecular weight of about 1300.

Exemplary ranges for polybutadiene epoxidized polymers for the embodiments described herein include from about 5 percent to about 20 percent by weight based on the total weight of the composition and all ranges and values inclusive of the range, including 5 to 10, 5 to 15, 6 to 18, 7 to 17, 6 to 15, 6 to 20, 7 to 20, 8 to 20, 5.1 to 20, 5.2 to 20, 6.1 to 20, 6.2 to20, 7.1 to 20, 7.2 to 20, 10.1 to 15.1, 10.2 to 15.2, etc.

Iron oxide can be included in the embodiments of the invention.

Exemplary ranges for iron oxide for the embodiments described herein include from about 5 percent to about 15 percent by weight based on the total weight of the composition and all ranges and values inclusive of the range, including 5 to 10, 5 to 15, 6 to 18, 7 to 17, 6 to 15, 9 to 15, etc.

Rockwood Pigments, black iron oxide ($Fe_3O_4$) J810,5 is an example of a suitable iron oxide.

"Driers", metal carboxylates, can be included in the embodiments of the invention. Drier metals are traditionally divided into two groups: active (or primary) and auxiliary (or secondary) though it is an arbitrary classification. Driers that promote oxygen absorption followed by peroxide formation and decomposition are termed active; auxiliary driers, while exhibiting no catalytic action on their own, appear to synergistically enhance the functioning of the active drier metals. It has been postulated that secondary driers function by forming complexes with primary drier metals.

Active (Primary) Driers: cobalt, zirconium, lead, cerium, iron etc.

Auxiliary (secondary) Driers: calcium, manganese, barium, zinc, lithium, etc.

Cobalt

Cobalt is "the drier" metal and is most extensively used. It is a powerful oxidation catalyst; and as a result, in coatings containing cobalt alone, the surface dries preferentially causing surface wrinkling and poor through dry in the extreme. It is therefore combined with other metals such as lead, manganese, calcium, zirconium, etc. traditionally (i.e. in conventional solids coatings) or with aluminum or lithium in modern high solids coatings. Cobalt has a red-violet purple color: however the yellow color of oils and resins counter this and resultant coatings have increased whiteness. Cobalt therefore is invariably preferred in white coatings.

Zirconium

Zirconium is the most widely accepted substitute for lead drier. It functions mainly by its catalytic activity on drier metals such as cobalt and manganese. The impetus for increased use of zirconium is environmental regulations restricting use of lead. Zirconium is effective in both air dry and bake coating systems. It improves gloss, hardness and through dry without any adverse effect on other coating properties.

Manganese

Manganese promotes both 'surface dry' and 'through dry', although it is less efficient then cobalt and lead in air drying finishes. In baking finishes manganese is superior to cobalt as it does not cause imbrutement. Manganese also gives better results than cobalt in low temperature drying performance and does not suffer from wrinkling under high humidity conditions. However, manganese is rarely used along but added as a modifier, with cobalt being use as a primary drier. Manganese generally imparts a pink/yellow color to white enamels and hence is best avoided in such finishes.

Exemplary ranges for "driers" for the embodiments described herein include from about 0.1 percent to about 0.5 percent by weight based on the total weight of the composition and all ranges and values inclusive of the range, including 0.1 to 0.4, 0.2 to 0.5, 0.3 to 0.5, 0.4 to 0.5, 0.1 to 0.3, etc.

Alkenylsuccinic anhydrides can be included in the embodiments of the invention. Alkenyl succinic anhydrides (ASA) are modified five-membered succinic anhydrides bearing a branched iso-alkenyl chain (C14 to C22).

Exemplary ranges for ASAs for the embodiments described herein include from about 0.1 percent to about 1 percent by weight based on the total weight of the composition and all ranges and values inclusive of the range, including 0.1 to 1, 0.2 to 1, 0.3 to 1, 0.5 to 1, 0.1 to 0.3, etc.

For example, Ircosperse 2176 is a commercially available alkenylsuccinic anhydride.

Functionalized acrylates can be included in the embodiments of the invention. For example, polyethylene glycol diacrylates are functionalized diacrylates. A suitable example is Sartomer SR 344 (Sartomer).

Exemplary ranges for multiacrylates for the embodiments described herein include from about 0.05 percent to about 2 percent by weight based on the total weight of the composition and all ranges and values inclusive of the range, including 0.01 to 2, 0.02 to 2, 0.03 to 2, 0.04 to 2, 0.01 to 1, 0.02 to 1, 0.03 to 1, 0.04 to 1, 0.1 to 0.3, etc.

Further optional components of the liquid composition of the grafting solution and of the formed graft coating include, for example, anti-oxidants, U.V. absorbing compounds, and other polymer stabilizers well known to the art, in art-known proportions. The coating compositions of the embodiments described herein can also optionally include other ingredients in amounts which are commonly included in paint and lacquer formulations such, wetting agents, bactericides, fungicides, mildew inhibitors, emulsifiers, suspending agents, flow control agents such as waxes or wax dispersions, level agents, thickening agents, pH control agents, slip agents such as silica or clay and the like.

Thus, the desired reagents, e.g., prepolymer(s) and/or monomers, catalyst, graft initiator system and other ingredients of the composition are mixed in a container with a compatible solvent or solvents to form Part A.

The components of Part A are generally mixed together and stirred at room temperature until homogeneous. Part A is generally stable at room temperature for about a one year period of time.

Part B of the grafting solution is prepared as a separate solution that does not typically include any active agents. This strategy avoids premature gelation or hardening of the composition over periods of storage.

Part B can include, as noted above, one or more solvent(s), silicate(s), anticorrosive pigment(s), silica, etc.

Any art-known corrosion inhibitor composition that is compatible and miscible with the components and solvents of the formulation can be employed. For example, art-known anticorrosion compounds and pigments include, one or more compounds such as silica (SHIELDEX® ACA 5 (Grace)), $SiO_2$, $Cr_2O_3$, $Cr(OH)_3$, $Al_2O_3$, calcium hydroxide, calcium carbonate, calcium oxide, zinc phosphate, zinc hydrogen phosphate, potassium phosphate, potassium hydrogen phosphate, calcium phosphate, calcium hydrogen phosphate, calcium silicate, zirconium silicate, aluminum phosphate, aluminum hydrogen phosphate, titanium oxide, zinc phosphate, zirconium phosphate, zirconium hydrogen phosphate, sulfuric acid, sodium sulfate, sodium hydrogen sulfate, phosphoric acid, sodium phosphate and sodium hydrogen phosphate, ionomers of ethylene copolymers, zinc phosphate complexes (HALOX® (ICL), a phosphosilicate (HALOX® Z Plex 111), strontium chromate (Strontium Chromate 176, (WPC Technologies, Inc.)), PTFE (polytetrafluoroethylene) powders (POLYMIST® or ALGOFLON® (Solvay)), hydrous magnesium silicate, (NYTAL 400, 325 mesh) and/or combinations of these.

For example, Halox 430 is a calcium phosphate based corrosion inhibitor, Halox SZP-391 is a zinc phosphate based corrosion inhibitor and Halox 570LS is the aqueous solution of Halox 570 which is a styrene acrylic, organic acid amine complex that is described in U.S. Pat. No. 5,519,074, the contents of which are incorporated herein in the entirety.

For example, suitable ranges for magnesium silicates for the embodiments described herein include from about 0.1 percent to about 20 percent by weight based on the total weight of the composition and all ranges and values inclusive of the range, including 0.1 to 1, 2 to 10, 5 to 10, 3 to 8, 0.1 to 1, 0.5 to 1, 0.5 to 0.9, 0.1 to 0.75, 0.2 to 0.5, 0.1 to 5, 0.2 to 5, 0.3 to 5, 0.4 to 5, 0.5 to 5, 1 to 5, 1 to 10, 2 to 5, 2 to 10, etc.

Suitable ranges for zinc phosphate complexes, strontium chromate as well as for other corrosion inhibitors for the embodiments described herein include from about 1 percent to about 20 percent by weight based on the total weight of the composition and all ranges and values inclusive of the range, including 0.1 to 1, 2 to 10, 5 to 10, 3 to 8, 3 to 9, 0.1 to 1, 0.5 to 1, 0.5 to 0.9, 0.1 to 0.75, 0.2 to 0.5, 0.1 to 15, 0.2 to 15, 0.3 to 15, 1 to 15, 2 to 15, 3 to 15, 1 to 12, 2 to 12, 3 to 12, 5 to 15, 5 to 10, etc.

These are employed in concentrations ranging from about 0.01% to about 25%, or more by weight, relative to the weight of the total of Part B of the grafting solution. More particularly, the corrosion inhibitor(s) is present in a concentration ranging from about 0.1 to about 15%, by weight of Part B.

A thickener, such as a hydrophilic fused silica, can be included in Part B as well. Suitable thickeners include, for example, CAB-O-SIL® HS5 (Cabot Corporation) or AEROSIL® fumed silicas available from Evonik.

The Part B composition is generally milled for approximately 24 hours using a mill system such as those supplied by Paul Gardner.

The Part B composition is generally stable for at least about a one year period of time.

The pH of the formulated liquid compositions should be in the range of from about 6-8, and appropriate amounts of a suitable acid, e.g. phosphoric or acetic acids or a base, e.g. sodium hydroxide, ammonia or ammonium hydroxide, can be included into the composition to adjust the pH as necessary.

Parts A and B are mixed in a suitable proportion, stirred to a uniform solution, and the resulting grafting solution is applied to the substrate to be treated. The time necessary for the reaction to run to completion depends up the reaction temperature, the reagents employed and the desired properties of the graft coating after application and curing.

The final grafting solution, after mixing Parts A and B together, is stable at room temperature for at least a month and more particularly up to a year, providing the advantage that the mixed components do not require immediate use upon mixing.

The metal substrate to be coated can be subjected to an optional pretreatment cleaning to remove any contaminating dust, grease and oil, prior to application of the grafting solution.

The mixed grafting solution is applied to the metal substrate, such as carbon steel, by any available art-known method, including, e.g., brushing, spraying, dipping, spin coating, vapor deposition, and the like. The viscosity of the grafting solution is adjusted as needed, so that, for example, it is sufficiently viscous for application by dipping or brushing, without significant dripping or running of the applied solution, or sufficiently thin when optionally sprayed onto the surface to be treated.

Generally, the solution is air dried onto the substrate for about 10 to about 15 minutes and then subjected to curing at approximately 170° C. for about 30 minutes.

Without meaning to be bound by any theory or hypothesis as to any proposed mechanism underlying the grafting reaction of the inventive process, the grafting reaction is believed to take place by means of a chain polymerization. This type of polymerization reaction, also referred to in the art as a "backbiting" reaction, consists of initiation and propagation reactions. Essentially, a graft initiator is contacted with the surface to be treated, e.g., a surface of an article formed in whole, or in part, of a metal to be graft coated.

Although the mechanism of reaction between a metal surface and monomers or prepolymers of the compositions herein is not fully established, it is believed that in the presence of moisture, a layer of oxides and hydroxyl groups becomes tenaciously bound to the metal substrate. The hydrogen of the hydroxyl group may be removed by the graft initiator to form a radical, which in turn reacts with the monomer or other provided reagent, starting graft polymerization.

Unless defined otherwise, all technical and scientific terms used herein have the same meanings as commonly understood by one of ordinary skill in the art to which the embodiments described herein belong. All publications and patents specifically mentioned herein are incorporated by reference in their entirety for all purposes including describing and disclosing the chemicals, instruments, statistical analyses and methodologies which are reported in the publications which might be used in connection with the embodiments described herein. All references cited in this specification are to be taken as indicative of the level of skill in the art. Nothing herein is to be construed as an admission that the embodiments described herein are not entitled to antedate such disclosure by virtue of prior invention.

The following paragraphs enumerated consecutively from 1 through 254 provide for various aspects of the present embodiments described herein. In one embodiment, in a first paragraph (1), the present embodiments described herein provide:

1. A coated substrate and a coating disposed thereon, wherein said substrate comprises a metal, and said graft coating comprises an epoxy prepolymer, a phenol/formaldehyde resin, a graft initiator, a catalyst, a fluorosurfactant, an acrylate monomer or acrylate prepolymer and a fluoropolymer.

2. The coated substrate of paragraph 1, wherein the graft coating further comprises materials selected from the group consisting of a pigment or colorant, an antioxidant, an ultraviolet blocker, and combinations thereof.

3. The coated substrate of either of paragraphs 1 or 2, further comprising an urea accelerator.

4. The coated substrate of paragraph 3, wherein the urea is a dimethylated urea.

5. The coated substrate of any of paragraphs 1 through 4, wherein the substrate comprises a metal or metal alloy selected from the group consisting of iron, steel, brass, copper, aluminum, silver, and combinations thereof.

6. The coated substrate of any of paragraphs 1 through 5, wherein the graft coated substrate is an article of manufacture that is a coil or a spring.

7. A liquid composition for coating a substrate comprising an epoxy prepolymer, a phenol/formaldehyde resin, a graft initiator, a catalyst and a fluorosurfactant, a solvent, an acrylate monomer or acrylate prepolymer and a fluoropolymer.

8. The liquid composition of paragraph 7, wherein the graft initiator comprises a metal ion ranging from about 0.01% to about 1.0% by weight of the total weight of the liquid composition.

9. The liquid composition of either paragraphs 7 or 8, wherein the graft initiator is a metal ion selected from the group consisting of ions of iron, silver, cobalt, copper, cerium, and combinations thereof.

10. The liquid composition of any of paragraphs 7 through 9, wherein the catalyst is a peroxide that comprises from about 0.01% to about 1.0% by weight of the total weight of the composition.

11. The liquid composition of any of paragraphs 7 through 10, wherein the fluorosurfactant is present from about 0.05% to about 1% by weight of the total weight of the composition, e.g., from about 0.1 to about 1%, from about 0.2 to about 1%, from about 0.3 to about 1%, from about 0.4 to about 1%, from about 0.5 to about 1% and from about 0.5 to about 0.75%. by weight of the total composition.

12. The liquid composition of any of paragraphs 7 through 11, wherein the epoxy prepolymer is present from about 1 to about 50 percent by weight of the total weight of the composition.

13. The liquid composition of any of paragraphs 7 through 11, wherein the epoxy prepolymer is present from about 2 to about 40 percent by weight of the total weight of the composition.

14. The liquid composition of any of paragraphs 7 through 11, wherein the epoxy prepolymer is present from about 5 to about 30 percent by weight of the total weight of the composition.

15. The liquid composition of any of paragraphs 7 through 11, wherein the epoxy prepolymer is present from about 10 to about 25 percent by weight of the total weight of the composition.

16. The liquid composition of any of paragraphs 7 through 15, wherein the phenol/formaldehyde resin is present from about 1 to about 50 percent by weight of the total weight of the composition.

17. The liquid composition of any of paragraphs 7 through 15, wherein the phenol/formaldehyde resin is present from about 2 to about 40 percent by weight of the total weight of the composition.

18. The liquid composition of any of paragraphs 7 through 15, wherein the phenol/formaldehyde resin is present from about 5 to about 30 percent by weight of the total weight of the composition.

19. The liquid composition of any of paragraphs 7 through 15, wherein the phenol/formaldehyde resin is present from about 10 to about 25 percent by weight of the total weight of the composition.

20. The liquid composition of any of paragraphs 7 through 19, wherein the fluoropolymer is present from about 0.1 to about 20 percent by weight of the total weight of the composition.

21. The liquid composition of any of paragraphs 7 through 19, wherein the fluoropolymer is present from about 0.5 to about 20 percent by weight of the total weight of the composition.

22. The liquid composition of any of paragraphs 7 through 19, wherein the fluoropolymer is present from about 1 to about 20 percent by weight of the total weight of the composition.

23. The liquid composition of any of paragraphs 7 through 19, wherein the fluoropolymer is present from about 2 to about 15 percent by weight of the total weight of the composition.

24. The liquid composition of any of paragraphs 7 through 23, further comprising a melamine wherein the melamine is present from about 0.1 to about 20 percent by weight of the total weight of the composition.

25. The liquid composition of paragraph 24, wherein the melamine is present from about 0.5 to about 20 percent by weight of the total weight of the composition.

26. The liquid composition of paragraph 24, wherein the melamine is present from about 1 to about 20 percent by weight of the total weight of the composition.

27. The liquid composition of paragraph 24, wherein the melamine is present from about 2 to about 15 percent by weight of the total weight of the composition.

28. The liquid composition of any of paragraphs 7 through 27, further comprising an alkyd prepolymer wherein the alkyd prepolymer is present from about 1 to about 50 percent by weight of the total weight of the composition.

29. The liquid composition of paragraph 28, wherein the alkyd prepolymer is present from about 2 to about 40 percent by weight of the total weight of the composition.

30. The liquid composition of paragraph 28, wherein the alkyd prepolymer is present from about 5 to about 30 percent by weight of the total weight of the composition.

31. The liquid composition of paragraph 28, wherein the alkyd prepolymer is present from about 10 to about 25 percent by weight of the total weight of the composition.

32. The liquid composition of any of paragraphs 7 through 31, further comprising an accelerator wherein the accelerator is present from about 0.1 to about 5 percent by weight of the total weight of the composition.

33. The liquid composition of paragraph 32, wherein the accelerator is present from about 0.5 to about 3 percent by weight of the total weight of the composition.

34. The liquid composition of paragraph 32, wherein the accelerator is present from about 1 to 2.5 percent by weight of the total weight of the composition.

35. The liquid composition of paragraph 32, wherein the accelerator is present from about 1.5 to about 2 percent by weight of the total weight of the composition.

36. The liquid composition of any of paragraphs 7 through 35, further comprising a strong acid catalyst wherein the strong acid catalyst is present from about 0.1 to about 5 percent by weight of the total weight of the composition.

37. The liquid composition of paragraph 36, wherein the strong acid catalyst is present from about 0.5 to about 3 percent by weight of the total weight of the composition.

38. The liquid composition of paragraph 36, wherein the strong acid catalyst is present from about 1 to 2.5 percent by weight of the total weight of the composition.

39. The liquid composition of paragraph 36, wherein the strong acid catalyst is present from about 1.5 to about 2 percent by weight of the total weight of the composition.

40. The liquid composition of any of paragraphs 7 through 39, further comprising a nonionic surfactant wherein the nonionic surfactant is present from about 0.01 to about 1 percent by weight of the total weight of the composition.

41. The liquid composition of paragraph 40, wherein the nonionic surfactant is present from about 0.05 to about 0.9 percent by weight of the total weight of the composition.

42. The liquid composition of paragraph 40, wherein the nonionic surfactant is present from about 0.1 to 0.75 percent by weight of the total weight of the composition.

43. The liquid composition of paragraph 40, wherein the nonionic surfactant is present from about 0.2 to about 0.5 percent by weight of the total weight of the composition.

44. The liquid composition of any of paragraphs 7 through 43, further comprising a cycloaliphatic epoxy silane wherein the cycloaliphatic epoxy silane is present from about 0.01 to about 1 percent by weight of the total weight of the composition.

45. The liquid composition of paragraph 44, wherein the cycloaliphatic epoxy silane is present from about 0.05 to about 0.9 percent by weight of the total weight of the composition.

46. The liquid composition of paragraph 44, wherein the cycloaliphatic epoxy silane is present from about 0.1 to 0.75 percent by weight of the total weight of the composition.

47. The liquid composition of paragraph 44, wherein the cycloaliphatic epoxy silane is present from about 0.2 to about 0.5 percent by weight of the total weight of the composition.

48. The liquid composition of any of paragraphs 7 through 47, further comprising a gamma-glycidoxypropyltrimethoxysilane wherein the gamma-glycidoxypropyltrimethoxysilane is present from about 0.01 to about 1 percent by weight of the total weight of the composition.

49. The liquid composition of paragraph 48, wherein the gamma-glycidoxypropyltrimethoxysilane is present from about 0.05 to about 0.9 percent by weight of the total weight of the composition.

50. The liquid composition of paragraph 48, wherein the gamma-glycidoxypropyltrimethoxysilane is present from about 0.1 to 0.75 percent by weight of the total weight of the composition.

51. The liquid composition of paragraph 48, wherein the gamma-glycidoxypropyltrimethoxysilane is present from about 0.2 to about 0.5 percent by weight of the total weight of the composition.

52. The liquid composition of any of paragraphs 7 through 51, further comprising a magnesium silicate wherein the magnesium silicate is present from about 1 to about 20 percent by weight of the total weight of the composition.

53. The liquid composition of paragraph 52, wherein the magnesium silicate is present from about 2 to about 10 percent by weight of the total weight of the composition.

54. The liquid composition of paragraph 52, wherein the magnesium silicate is present from about 5 to about 10 percent by weight of the total weight of the composition.

55. The liquid composition of paragraph 52, wherein the magnesium silicate is present from about 3 to about 8 percent by weight of the total weight of the composition.

56. The liquid composition of any of paragraphs 7 through 55, further comprising a one or more silicas wherein the silica is present from about 1 to about 20 percent by weight of the total weight of the composition.

57. The liquid composition of paragraph 56, wherein the silica is present from about 2 to about 10 percent by weight of the total weight of the composition.

58. The liquid composition of paragraph 56, wherein the silica is present from about 5 to about 10 percent by weight of the total weight of the composition.

59. The liquid composition of paragraph 56, wherein the silica is present from about 3 to about 8 percent by weight of the total weight of the composition.

60. The liquid composition of any of paragraphs 7 through 59, further comprising a phosphosilicate wherein the phosphosilicate is present from about 1 to about 20 percent by weight of the total weight of the composition.

61. The liquid composition of paragraph 60, wherein the phosphosilicate is present from about 5 to about 15 percent by weight of the total weight of the composition.

62. The liquid composition of paragraph 60, wherein the phosphosilicate is present from about 5 to about 10 percent by weight of the total weight of the composition.

63. The liquid composition of paragraph 60, wherein the phosphosilicate is present from about 3 to about 8 percent by weight of the total weight of the composition.

64. The liquid composition of any of paragraphs 7 through 63, further comprising a strontium chromate wherein the strontium chromate is present from about 1 to about 20 percent by weight of the total weight of the composition.

65. The liquid composition of paragraph 64, wherein the strontium chromate is present from about 2 to about 10 percent by weight of the total weight of the composition.

66. The liquid composition of paragraph 64, wherein the strontium chromate is present from about 5 to about 10 percent by weight of the total weight of the composition.

67. The liquid composition of paragraph 64, wherein the strontium chromate is present from about 3 to about 8 percent by weight of the total weight of the composition.

68. The liquid composition of any of paragraphs 7 through 67, further comprising a polytetrafluoroethylene powder wherein the polytetrafluoroethylene powder is present from about 1 to about 20 percent by weight of the total weight of the composition.

69. The liquid composition of paragraph 68, wherein the polytetrafluoroethylene powder is present from about 2 to about 10 percent by weight of the total weight of the composition.

70. The liquid composition of paragraph 68, wherein polytetrafluoroethylene powder is present from about 5 to about 10 percent by weight of the total weight of the composition.

71. The liquid composition of paragraph 68, wherein the polytetrafluoroethylene powder is present from about 3 to about 8 percent by weight of the total weight of the composition.

72. The liquid composition of any of paragraphs 7 through 71, further comprising a colorant wherein the colorant is present from about 1 to about 20 percent by weight of the total weight of the composition.

73. The liquid composition of paragraph 72, wherein the colorant is present from about 5 to about 15 percent by weight of the total weight of the composition.

74. The liquid composition of paragraph 72, wherein the colorant is present from about 5 to about 10 percent by weight of the total weight of the composition.

75. The liquid composition of paragraph 72, wherein the colorant is present from about 3 to about 8 percent by weight of the total weight of the composition.

76. The liquid composition of any of paragraphs 7 through 75, further comprising a solvent or solvents wherein the solvent or solvents is present from about 1 to about 50 percent by weight of the total weight of the composition.

77. The liquid composition of paragraph 76, wherein the solvent or solvents is present from about 2 to about 40 percent by weight of the total weight of the composition.

78. The liquid composition of paragraph 76, wherein the solvent or solvents is present from about 5 to about 30 percent by weight of the total weight of the composition.

79. The liquid composition of paragraph 76, wherein the solvent or solvents is present from about 10 to about 25 percent by weight of the total weight of the composition.

80. A method of protecting a metal substrate from rust or corrosion comprising contacting a metal substrate with the coating solution according to any of paragraphs 7 through 79 under conditions effective to promote grafting of the components to the metal substrate, and curing the applied graft coating solution.

81. The method of paragraph 80, wherein the metal substrate is carbon steel.

82. The method of paragraph 80, wherein the curing step comprises heating the coated metal substrate to a temperature of about 100° C. to about 200° C.

83. The method of paragraph 82, wherein the temperature is from about 125° C. to about 175° C.

84. The method of either paragraph 82 or 83, wherein the heating time is from about 1 minute to about 60 minutes.

85. The method of paragraph 84, wherein the heating time is about 30 minutes.

86. The coated substrate of any of paragraphs 1 through 6 and paragraphs 80 through 85, wherein the coating is a graft coating.

87. The coated substrate of any of paragraphs 1 through 6 and paragraphs 80 through 85, wherein the coating is covalently attached to the substrate.

88. The method of any of paragraphs 76 through 79, wherein one solvent is water.

89. A coated substrate and a coating disposed thereon, wherein said substrate comprises a metal, and said coating comprises:
   a phenoxy prepolymer;
   a melamine;
   a graft initiator;
   a catalyst;
   a nonionic surfactant;
   a polyester prepolymer; and
   a polybutadiene polyepoxide.

90. The coated substrate of paragraph 89, wherein the coating further comprises materials selected from the group consisting of a pigment or colorant, an antioxidant, an ultraviolet blocker, and combinations thereof.

91. The coated substrate of either paragraphs 89 or 90, wherein the phenoxy prepolymer is present from about 18 percent to about 30 percent by weight of the total weight of the composition.

92. The coated substrate of any of paragraphs 89 through 91, wherein the phenoxy prepolymer comprises a phenoxy polyhydroxyether.

93. The coated substrate of any of paragraphs 89 through 92, wherein the melamine prepolymer is present from about 5 percent to about 10 percent by weight of the total weight of the composition.

94. The coated substrate of any of paragraphs 89 through 93, wherein the melamine prepolymer is a hexamethoxymethylmelamine.

95. The coated substrate of any of paragraphs 89 through 94, wherein the graft initiator comprises a metal ion ranging from about 0.01 percent to about 1.0 percent by weight of the total weight of the composition.

96. The coated substrate of any of paragraphs 89 through 95, wherein the graft initiator is a metal ion selected from the group consisting of ions of iron, silver, cobalt, copper, cerium, and combinations thereof.

97. The coated substrate of any of paragraphs 89 through 96, wherein the catalyst is a peroxide that comprises from about 0.01 percent to about 1.0 percent by weight of the total weight of the composition.

98. The coated substrate of paragraph 97, wherein the peroxide is a urea peroxide.

99. The coated substrate of any of paragraphs 89 through 98, wherein the nonionic surfactant is present from about 0.1 percent to about 5 percent by weight of the total weight of the composition.

100. The coated substrate of any of paragraphs 89 through 99, wherein the nonionic surfactant is a polyalkyloxide surfactant.

101. The coated substrate of paragraph 100, wherein the polyalkyloxide surfactant is t-octylphenoxypolyethoxyethanol.

102. The coated substrate of any of paragraphs 89 through 101, wherein the polyester prepolymer is present from about 8 percent to about 20 percent by weight of the total weight of the composition.

103. The coated substrate of any of paragraphs 89 through 102, wherein the polyester prepolymer is an alkyl ester of an acetoacetate.

104. The coated substrate of paragraph 103, wherein the alkyl ester of the acetoacetate is a triacetoacetate ester.

105. The coated substrate of any of paragraph 89 through 104, wherein the polybutadiene polyepoxide is present from about 6 percent to about 20 percent by weight of the total weight of the composition.

106. The coated substrate of any of paragraph 89 through 105, wherein the polybutadiene polyepoxide has a molecular weight ($M_e$) of about 1300 to about 2600.

107. The coated substrate of paragraph 106, wherein the polybutadiene polyepoxide has an epoxy value (meq/g) of about 2 to about 4.

108. The coated substrate of any of paragraphs 89 through 107 further comprising an epoxy silane wherein the epoxy silane is present from about 0.01 percent to about 2 percent by weight of the total weight of the composition.

109. The coated substrate of paragraph 108, wherein the epoxy silane is a cycloaliphatic epoxy silane 110. The coated substrate of any of paragraphs 89 through 109, further comprising a magnesium silicate wherein the magnesium silicate is present from about 0.1 percent to about 5 percent by weight of the total weight of the composition.

111. The coated substrate of paragraph 110, wherein the magnesium silicate is micronized.

112. The coated substrate of any of paragraphs 89 through 111, further comprising black iron oxide.

113. The coated substrate of paragraph 112, wherein the black iron oxide is present from about 9 percent to about 15 percent by weight of the total weight of the composition.

114. The coated substrate of any of paragraphs 89 through 113, further comprising one or more corrosion inhibitor(s).

115. The coated substrate of paragraph 114, wherein the corrosion inhibitor(s) is present from about 3 percent to about 15 percent by weight of the total weight of the composition.

116. The coated substrate of either of paragraphs 114 or 115, wherein the corrosion inhibitor(s) comprise calcium phosphate(s) and/or strontium chromate(s) and/or calcium ion-exchanged amorphous silica.

117. The coated substrate of any of paragraphs 89 through 116, further comprising one or more alkenyl succinic anhydrides.

118. The coated substrate of paragraph 117, wherein the alkenyl succinic anhydride is present from about 0.2 percent to about 1 percent by weight of the total weight of the composition.

119. The coated substrate of any of paragraphs 89 through 118, further comprising one or more metal carboxylate(s).

120. The coated substrate of paragraph 119, wherein the metal carboxylate(s) is present from about 0.1 percent to about 0.5 percent by weight of the total weight of the composition.

121. The coated substrate of paragraph 120, wherein the metal ion of the carboxylate is zirconium or cobalt or both.

122. The coated substrate of any of paragraph 89 through 121 further comprising a polyethylene glycol multiacrylate.

123. The coated substrate of paragraph 122, wherein the polyethylene glycol multiacrylate is present from about 0.05 percent to about 2 percent by weight of the total weight of the composition.

124. The coated substrate of paragraph 123, wherein the polyethylene glycol multiacrylate is a polyethylene glycol (400) diacrylate.

125. The coated substrate of any of paragraphs 90 through 124, wherein the colorant is present from about 1 to about 10 percent by weight of the total weight of the composition.

126. The coated substrate of any of paragraph 89 through 125 further comprising one or more solvents.

127. The coated substrate of paragraph 126, wherein the solvent is water.

128. The coated substrate of paragraph 127, wherein the water is present from about 15 percent to about 40 percent by weight of the total weight of the composition.

129. The coated substrate of any of paragraphs 89 through 128, wherein the substrate comprises a metal or metal alloy selected from the group consisting of iron, steel, brass, copper, aluminum, silver, and combinations thereof.

130. The coated substrate of any of paragraphs 89 through 129, wherein the substrate is an article of manufacture that is a coil or a spring.

131. The coated substrate of any of paragraphs 89 through 130, wherein the coating is a graft coating.

132. The coated substrate of any of paragraphs 89 through 131, wherein the coating is covalently attached to the substrate.

133. A method of protecting a metal substrate from rust or corrosion comprising contacting a metal substrate with the coating solution according to any of paragraphs 89 through 132 under conditions effective to promote coating of the components to the metal substrate, and curing the applied coating solution.

134. The method of paragraph 133, wherein the metal substrate is carbon steel.

135. The method of paragraph 133, wherein the curing step comprises heating the coated metal substrate to a temperature of about 100° C. to about 200° C.

136. The method of paragraph 135, wherein the temperature is from about 125° C. to about 175° C.

137. The method of either paragraph 135 or 136, wherein the heating time is from about 1 minute to about 60 minutes.

138. The method of paragraph 137, wherein the heating time is about 30 minutes.

139. A liquid composition for coating a substrate comprising:
 a phenoxy prepolymer;
 a melamine;
 a graft initiator;
 a catalyst;
 a nonionic surfactant;
 a polyester prepolymer;
 a polybutadiene polyepoxide; and
 optionally, one or more solvent(s).

140. The liquid composition of paragraph 139, wherein the liquid composition further comprises materials selected from the group consisting of a pigment or colorant, an antioxidant, an ultraviolet blocker, and combinations thereof.

141. The liquid composition of either paragraphs 139 or 140, wherein the phenoxy prepolymer is present from about 18 percent to about 30 percent by weight of the total weight of the composition.

142. The liquid composition of any of paragraphs 139 through 141, wherein the phenoxy prepolymer comprises a phenoxy polyhydroxyether.

143. The liquid composition of any of paragraphs 139 through 142, wherein the melamine prepolymer is present from about 5 percent to about 10 percent by weight of the total weight of the composition.

144. The liquid composition of any of paragraphs 139 through 143, wherein the melamine prepolymer is a hexamethoxymethylmelamine.

145. The liquid composition of any of paragraphs 139 through 144, wherein the graft initiator comprises a metal ion ranging from about 0.01 percent to about 1.0 percent by weight of the total weight of the composition.

146. The liquid composition of any of paragraphs 139 through 145, wherein the graft initiator is a metal ion selected from the group consisting of ions of iron, silver, cobalt, copper, cerium, and combinations thereof.

147. The liquid composition of any of paragraphs 139 through 146, wherein the catalyst is a peroxide that comprises from about 0.01 percent to about 1.0 percent by weight of the total weight of the composition.

148. The liquid composition of paragraph 147, wherein the peroxide is a urea peroxide.

149. The liquid composition of any of paragraphs 139 through 148, wherein the nonionic surfactant is present from about 0.1 percent to about 5 percent by weight of the total weight of the composition.

150. The liquid composition of any of paragraphs 139 through 149, wherein the nonionic surfactant is a polyalkyloxide surfactant.

151. The liquid composition of paragraph 150, wherein the polyalkyloxide surfactant is t-octylphenoxypolyethoxyethanol.

152. The liquid composition of any of paragraphs 139 through 151, wherein the polyester prepolymer is present from about 8 percent to about 20 percent by weight of the total weight of the composition.

153. The liquid composition of any of paragraphs 139 through 152, wherein the polyester prepolymer is an alkyl ester of an acetoacetate.

154. The liquid composition of paragraph 153, wherein the alkyl ester of the acetoacetate is a triacetoacetate ester.

155. The liquid composition of any of paragraph 139 through 154, wherein the polybutadiene polyepoxide is present from about 6 percent to about 20 percent by weight of the total weight of the composition.

156. The liquid composition of any of paragraph 139 through 155, wherein the polybutadiene polyepoxide has a molecular weight ($M_e$) of about 1300 to about 2600.

157. The liquid composition of paragraph 156, wherein the polybutadiene polyepoxide has an epoxy value (meq/g) of about 2 to about 4.

158. The liquid composition of any of paragraphs 139 through 157 further comprising an epoxy silane wherein the epoxy silane is present from about 0.01 percent to about 2 percent by weight of the total weight of the composition.

159. The liquid composition of paragraph 158, wherein the epoxy silane is a cycloaliphatic epoxy silane 160. The liquid composition of any of paragraphs 139 through 159, further comprising a magnesium silicate wherein the magnesium silicate is present from about 0.1 percent to about 5 percent by weight of the total weight of the composition.

161. The liquid composition of paragraph 160, wherein the magnesium silicate is micronized.

162. The liquid composition of any of paragraphs 139 through 161, further comprising black iron oxide.

163. The liquid composition of paragraph 162, wherein the black iron oxide is present from about 9 percent to about 15 percent by weight of the total weight of the composition.

164. The liquid composition of any of paragraphs 139 through 163, further comprising one or more corrosion inhibitor(s).

165. The liquid composition of paragraph 164, wherein the corrosion inhibitor(s) is present from about 3 percent to about 15 percent by weight of the total weight of the composition.

166. The liquid composition of either of paragraphs 164 or 165, wherein the corrosion inhibitor(s) comprise calcium phosphate(s) and/or strontium chromate(s) and/or calcium ion-exchanged amorphous silica.

167. The liquid composition of any of paragraphs 139 through 166, further comprising one or more alkenyl succinic anhydrides.

168. The liquid composition of paragraph 167, wherein the alkenyl succinic anhydride is present from about 0.2 percent to about 1 percent by weight of the total weight of the composition.

169. The liquid composition of any of paragraphs 139 through 168, further comprising one or more metal carboxylate(s).

170. The liquid composition of paragraph 169, wherein the metal carboxylate(s) is present from about 0.1 percent to about 0.5 percent by weight of the total weight of the composition.

171. The liquid composition of paragraph 170, wherein the metal ion of the carboxylate is zirconium or cobalt or both.

172. The liquid composition of any of paragraph 139 through 171 further comprising a polyethylene glycol multiacrylate.

173. The liquid composition of paragraph 172, wherein the polyethylene glycol multiacrylate is present from about 0.05 percent to about 1 percent by weight of the total weight of the composition.

174. The liquid composition of paragraph 173, wherein the polyethylene glycol multiacrylate is a polyethylene glycol (400) diacrylate.

175. The liquid composition of any of paragraphs 140 through 174, wherein the colorant is present from about 1 to about 10 percent by weight of the total weight of the composition.

176. The liquid composition of any of paragraph 139 through 175 further comprising one or more solvents.

177. The liquid composition of paragraph 176, wherein the optional solvent comprises water.

178. The liquid composition of paragraph 177, wherein the water is present from about 15 percent to about 40 percent by weight of the total weight of the composition.

179. A coated substrate and a coating disposed thereon, wherein said substrate comprises a metal, and said coating comprises:
an epoxy prepolymer;
a melamine;
a graft initiator;

a catalyst;
a nonionic surfactant;
a polyester resin; and
a phenol/formaldehyde resin.

180. The coated substrate of paragraph 179, wherein the coating further comprises materials selected from the group consisting of a pigment or colorant, an antioxidant, an ultraviolet blocker, and combinations thereof.

181. The coated substrate of either paragraphs 179 or 180, wherein the epoxy prepolymer is present from about 25 percent to about 40 percent by weight of the total weight of the composition.

182. The coated substrate of any of paragraphs 179 through 181, wherein the epoxy prepolymer comprises a bisphenol A epoxy.

183. The coated substrate of any of paragraphs 179 through 182, wherein the melamine prepolymer is present from about 1.5 percent to about 5 percent by weight of the total weight of the composition.

184. The coated substrate of any of paragraphs 179 through 183, wherein the melamine prepolymer is a hexamethoxymethylmelamine.

185. The coated substrate of any of paragraphs 179 through 184, wherein the graft initiator comprises a metal ion ranging from about 0.01 percent to about 1.0 percent by weight of the total weight of the composition.

186. The coated substrate of any of paragraphs 179 through 185, wherein the graft initiator is a metal ion selected from the group consisting of ions of iron, silver, cobalt, copper, cerium, and combinations thereof.

187. The coated substrate of any of paragraphs 179 through 186, wherein the catalyst is a peroxide that comprises from about 0.01 percent to about 1.0 percent by weight of the total weight of the composition.

188. The coated substrate of paragraph 187, wherein the peroxide is a urea peroxide.

189. The coated substrate of any of paragraphs 179 through 188, wherein the nonionic surfactant is present from about 0.1 percent to about 5 percent by weight of the total weight of the composition.

190. The coated substrate of any of paragraphs 179 through 189, wherein the nonionic surfactant is a perfluorinated alkylated substance (PFSA) that includes a terminal sulfonic acid, sulfonate or carboxylic acid or salt thereof.

191. The coated substrate of paragraph 190, wherein the PFSA comprises perfluorooctanoic acid (PFOA), perfluorooctane sulfonate (PFOS), perfluorohexane sulfonic acid (PFHxS), perfluorononanoic acid (PFNA), perfluorodecanoic acid (PFDA) or mixtures of two of more PFS As.

192. The coated substrate of any of paragraphs 179 through 191, wherein the polyester is present from about 15 percent to about 25 percent by weight of the total weight of the composition.

193. The coated substrate of any of paragraphs 179 through 192, wherein the polyester comprises a sulfopolyester, having 5-sodiosulphonyl isophthalic acid residue.

194. The coated substrate of paragraph 193, wherein the sulfopolyester has a Tg of from about 30 to 35° C.

195. The coated substrate of any of paragraph 179 through 194, wherein the phenol/formaldehyde resin is present from about 1 percent to about 5 percent by weight of the total weight of the composition.

196. The coated substrate of any of paragraph 179 through 195, wherein the phenol/formaldehyde resin comprises a butyl etherified phenol formaldehyde resin.

197. The coated substrate of any of paragraphs 179 through 196 further comprising an epoxy silane wherein the epoxy silane is present from about 0.01 percent to about 2 percent by weight of the total weight of the composition.

198. The coated substrate of paragraph 197, wherein the epoxy silane is a cycloaliphatic epoxy silane 199. The coated substrate of any of paragraphs 179 through 198, further comprising one or more corrosion inhibitor(s).

200. The coated substrate of paragraph 199, wherein the corrosion inhibitor(s) is present from about 3 percent to about 15 percent by weight of the total weight of the composition.

201. The coated substrate of either of paragraphs 199 or 200, wherein the corrosion inhibitor(s) comprise calcium phosphate(s) and/or strontium chromate(s) and/or calcium ion-exchanged amorphous silica.

202. The coated substrate of any of paragraph 179 through 201 further comprising a polyethylene glycol multiacrylate.

203. The coated substrate of paragraph 202, wherein the polyethylene glycol multiacrylate is present from about 0.05 percent to about 2 percent by weight of the total weight of the composition.

204. The coated substrate of paragraph 203, wherein the polyethylene glycol multiacrylate is a polyethylene glycol (400) diacrylate.

205. The coated substrate of any of paragraphs 180 through 204, wherein the colorant is present from about 1 to about 10 percent by weight of the total weight of the composition.

206. The coated substrate of any of paragraph 179 through 205 further comprising one or more solvents.

207. The coated substrate of paragraph 206, wherein one of the solvents is water.

208. The coated substrate of paragraph 207, wherein the water is present from about 25 percent to about 40 percent by weight of the total weight of the composition.

209. The coated substrate of paragraph 206, wherein one of the solvents comprise a water miscible solvent.

210. The coated substrate of paragraph 209, wherein the water miscible solvent comprises a glycol.

211. The coated substrate of either of paragraphs 209 or 210, wherein the water miscible solvent is present from about 10 percent by weight to about 20 percent by weight of the total weight of the composition.

212. The coated substrate of any of paragraphs 179 through 211, wherein the substrate comprises a metal or metal alloy selected from the group consisting of iron, steel, brass, copper, aluminum, silver, and combinations thereof.

213. The coated substrate of any of paragraphs 179 through 212, wherein the substrate is an article of manufacture that is a coil or a spring.

214. The coated substrate of any of paragraphs 179 through 213, wherein the coating is a graft coating.

215. The coated substrate of any of paragraphs 179 through 214, wherein the coating is covalently attached to the substrate.

216. A method of protecting a metal substrate from rust or corrosion comprising contacting a metal substrate with the coating solution according to any of paragraphs 179 through 215 under conditions effective to promote coating of the components to the metal substrate, and curing the applied coating solution.

217. The method of paragraph 216, wherein the metal substrate is carbon steel.

218. The method of paragraph 216, wherein the curing step comprises heating the coated metal substrate to a temperature of about 100° C. to about 200° C.

219. The method of paragraph 218, wherein the temperature is from about 125° C. to about 175° C.

220. The method of either paragraph 218 or 219, wherein the heating time is from about 1 minute to about 60 minutes.

221. The method of paragraph 220, wherein the heating time is about 30 minutes.

222. A liquid composition for coating a substrate comprising:
an epoxy prepolymer;
a melamine;
a graft initiator;
a catalyst;
a nonionic surfactant;
a polyester resin; and
a phenol/formaldehyde resin.

223. The liquid composition of paragraph 222, wherein the coating further comprises materials selected from the group consisting of a pigment or colorant, an antioxidant, an ultraviolet blocker, and combinations thereof.

224. The liquid composition of either paragraphs 222 or 223, wherein the epoxy prepolymer is present from about 25 percent to about 40 percent by weight of the total weight of the composition.

225. The liquid composition of any of paragraphs 222 through 224, wherein the epoxy prepolymer comprises a bisphenol A epoxy.

226. The liquid composition of any of paragraphs 222 through 225, wherein the melamine prepolymer is present from about 1.5 percent to about 5 percent by weight of the total weight of the composition.

227. The liquid composition of any of paragraphs 222 through 226, wherein the melamine prepolymer is a hexamethoxymethylmelamine.

228. The liquid composition of any of paragraphs 222 through 227, wherein the graft initiator comprises a metal ion ranging from about 0.01 percent to about 1.0 percent by weight of the total weight of the composition.

229. The liquid composition of any of paragraphs 222 through 228, wherein the graft initiator is a metal ion selected from the group consisting of ions of iron, silver, cobalt, copper, cerium, and combinations thereof.

230. The liquid composition of any of paragraphs 222 through 229, wherein the catalyst is a peroxide that comprises from about 0.01 percent to about 1.0 percent by weight of the total weight of the composition.

231. The liquid composition of paragraph 230, wherein the peroxide is a urea peroxide.

232. The liquid composition of any of paragraphs 222 through 231, wherein the nonionic surfactant is present from about 0.1 percent to about 5 percent by weight of the total weight of the composition.

233. The liquid composition of any of paragraphs 222 through 232, wherein the nonionic surfactant is a perfluorinated alkylated substance (PFSA) that includes a terminal sulfonic acid, sulfonate or carboxylic acid or salt thereof.

234. The liquid composition of paragraph 233, wherein the PFSA comprises perfluorooctanoic acid (PFOA), perfluorooctane sulfonate (PFOS), perfluorohexane sulfonic acid (PFHxS), perfluorononanoic acid (PFNA), perfluorodecanoic acid (PFDA) or mixtures of two of more PFSAs.

235. The liquid composition of any of paragraphs 222 through 234, wherein the polyester is present from about 15 percent to about 35 percent by weight of the total weight of the composition.

236. The liquid composition of any of paragraphs 222 through 235, wherein the polyester comprises a sulfopolyester, having 5-sodiosulphonyl isophthalic acid residue.

237. The liquid composition of paragraph 236, wherein the sulfopolyester has a Tg of from about 30 to 35° C.

238. The liquid composition of any of paragraph 222 through 237, wherein the phenol/formaldehyde resin is present from about 1 percent to about 5 percent by weight of the total weight of the composition.

239. The liquid composition of any of paragraph 222 through 238, wherein the phenol/formaldehyde resin comprises a butyl etherified phenol formaldehyde resin.

240. The liquid composition of any of paragraphs 222 through 239 further comprising an epoxy silane wherein the epoxy silane is present from about 0.01 percent to about 2 percent by weight of the total weight of the composition.

241. The liquid composition of paragraph 240, wherein the epoxy silane is a cycloaliphatic epoxy silane 242. The liquid composition of any of paragraphs 222 through 241, further comprising one or more corrosion inhibitor(s).

243. The liquid composition of paragraph 242, wherein the corrosion inhibitor(s) is present from about 3 percent to about 15 percent by weight of the total weight of the composition.

244. The liquid composition of either of paragraphs 242 or 243, wherein the corrosion inhibitor(s) comprise calcium phosphate(s) and/or strontium chromate(s) and/or calcium ion-exchanged amorphous silica.

245. The liquid composition of any of paragraph 222 through 244 further comprising a polyethylene glycol multiacrylate.

246. The liquid composition of paragraph 245, wherein the polyethylene glycol multiacrylate is present from about 0.05 percent to about 2 percent by weight of the total weight of the composition.

247. The liquid composition of paragraph 246, wherein the polyethylene glycol multiacrylate is a polyethylene glycol (400) diacrylate.

248. The liquid composition of any of paragraphs 223 through 247, wherein the colorant is present from about 1 to about 10 percent by weight of the total weight of the composition.

249. The liquid composition of any of paragraph 222 through 248 further comprising one or more solvents.

250. The liquid composition of paragraph 249, wherein one of the solvents is water.

251. The liquid composition of paragraph 250, wherein the water is present from about 25 percent to about 40 percent by weight of the total weight of the composition.

252. The liquid composition of paragraph 249, wherein one of the solvents comprise a water miscible solvent.

253. The liquid composition of paragraph 252, wherein the water miscible solvent comprises a glycol.

254. The liquid composition of either of paragraphs 252 or 253, wherein the water miscible solvent is present from about 10 percent by weight to about 20 percent by weight of the total weight of the composition.

It should be understood that each of the components described herein can be utilized in combination with one or more of the other components described herein. The examples which follow should not be considered limiting in terms of the combinations of the components described herein.

Also, it should be understood that throughout the specification that percentage ranges of materials and temperatures are provided and that the ranges are inclusive of all ranges and individual percentages, units, or temperatures included there between. For example, for a range of from about 1 to about 10 percent, the subranges include, for example, 2 to 10, 3 to 10, 4 to 10, 5 to 10, 6 to 10, 7 to 10, 8 to 10, 9 to 10, 1 to 2, 1 to 3, 1 to 4, etc., 2 to 3, 2 to 4, 2 to 5 etc., 3 to 8, 4 to 6, 6 to 9 and all possible ranges included by the largest range provides, e.g., 1 to 10 percent. For example, for a range of from about 0.01 to about 2 percent, the subranges include, for example, 0.02 to 2, 0.03 to 2, 0.04 to 2, 0.05 to 2, etc. including 0.09 to 2, 0.01 to 1.95, 0.01 to 1.9, 0.01 to 1.8, etc. and all values and ranges between 0.01 to 2.

Similarly, with regard to temperatures and time periods stated herein, the range includes all values and ranges between the lower and upper endpoints.

It should also be understood that certain components described herein can be specifically not included in all embodiments. For example, certain embodiments may exclude one or more solvent(s) or certain additives, such as polyesters and other components described herein.

EXAMPLES

Example I (Part A)

| NAME OF CHEMICAL | PARTS BY WEIGHT |
| --- | --- |
| Dimethyl urea Dyhard UR 500 | 1.50 |
| Methyl ethyl ketone | 65.00 |
| Epoxy prepolymer EPON ™ 1007 × 55 | 30.00 |
| High MW Epoxy prepolymer D.E.R. ™ 684-40 | 15.00 |
| Alkyd prepolymer KELSOL ® 3964-BG70 | 45.00 |
| D-B Solvent | 18.00 |
| Melamine prepolymer CYMEL ® 303 | 4.50 |
| Phenol prepolymer PHENODUR ® PR285/55-1B | 3.00 |
| Phenol prepolymer PHENODUR ® PR 521/60B | 5.00 |
| Toluene | 12.00 |
| Fluoropolymer LUMIFLON ® LF 9716 | 4.50 |
| Catalyst NACURE ® 5076 | 1.00 |
| Color TINT-AYD ® ST 8317 | 18.00 |
| Milling formulation (Part B) | 60.00 |
| Fluorosurfactant FC 4430 2% in toluene | 1.00 |
| Surfactant TRITON ™ X-100 | 0.50 |
| Monomer CoatOSil 1770 | 0.50 |
| Monomer silane A-187 | 0.50 |
| Methyl ketone peroxide 0.10% in toluene | 0.10 |
| Silver perchlorate 0.1% in toluene | 0.01 |

Example II (Part A)

| NAME OF CHEMICAL | PARTS BY WEIGHT |
| --- | --- |
| Dimethyl urea Dyhard UR 500 | 1.50 |
| Methyl Ethyl ketone | 65.00 |
| Epoxy prepolymer EPON ™ 1007 × 55 | 30.00 |
| High MWt epoxy prepolymer ARALDITE ® 488N40 | 15.00 |
| Alkyd prepolymer KELSOL ® 3964 BG 70 | 45.00 |
| D-B Solvent | 18.00 |
| Melamine prepolymer CYMEL ® 303 | 4.50 |
| Phenol prepolymer PHENODUR ® PR 285/55-1B | 3.00 |
| Phenol prepolymer PHENODUR ® PR 521/60 B | 5.00 |
| Toluene | 12.00 |
| Methyl Methacrylate | 0.50 |
| Fluoropolymer LUMIFLON ® LF 9716 | 4.50 |
| Catalyst NACURE ® 5076 | 1.00 |
| Color TINT-AYD ® ST 8317 | 18.00 |
| Milling formulation (Part B) | 60.00 |
| Fluorosurfactant FC 4430 2% solution | 1.00 |
| Surfactant TRITON ™ X-100 | 0.50 |
| Monomer CoatOSil 1770 | 0.50 |
| Monomer silane A1100 | 0.50 |
| Methyl ethyl ketone peroxide 0.1% in Toluene | 0.10 |
| Silver perchlorate 0.1% in Toluene | 0.01 |

Example III (Part A)

| NAME OF CHEMICAL | PARTS BY WEIGHT |
| --- | --- |
| Dimethyl urea Dyhard UR 500 | 1.50 |
| Methyl ethyl ketone | 65.00 |
| Epoxy prepolymer EPON ™ 1007 × 55 | 30.00 |
| High MWt Epoxy prepolymer D.E.R. ™ 684-40 | 15.00 |
| Alkyd prepolymer KELSOL ® 3964 BG70 | 45.00 |
| D.B. Solvent | 18.00 |
| Melamine prepolymer CYMEL ® 303 | 4.50 |
| Phenolic prepolymer Santolink EP 560 | 8.00 |
| Toluene | 12.00 |
| Methyl Methacrylate | 0.50 |
| Fluoropolymer LUMIFLON ® LF 9716 | 4.50 |
| Catalyst NACURE ® 5076 | 1.00 |
| Color TINT-AYD ® ST 8317 | 18.00 |
| Milling Formulation (Part B) | 60.00 |
| Fluorosurfactant FC4430 2.0% solution | 1.00 |
| TRITON ™ X 100 | 0.50 |
| Monomer CoatOSil 1770 | 0.50 |
| Monomer silane A-187 | 0.50 |
| Methyl ethyl ketone peroxide 0.1% solution | 0.10 |
| Silver perchlorate 0.1% solution | 0.01 |

Milling Formulation (Part B)

| NAME OF CHEMICAL | PARTS BY WEIGHT |
| --- | --- |
| D-B Solvent | 50.00 |
| Magnesium silicate NYTAL 400 | 20.00 |
| Anticorrosive pigment SHIELDEX ® AC5 | 10.00 |
| HALOX ® Z Plex 111 | 25.00 |
| Strontium Chromate 176 | 10.00 |
| Fluoropolymer POLYMIST ® F5A | 10.00 |
| Thickener Cab-O-Sil HS-5 | 3.00 |

Components of Examples I, II and III (Part A) were mixed together at room temperature until a uniform solution was obtained.

Components of the Milling Formulation (Part B) were mixed in a mill for approximately 24 hours until homogeneous.

Components of Example I, II or III (Part A) were then combined with required amount of Part B and stirred for approximately 30 minutes or until homogenous at room temperature. The liquid composition was then applied to a metal substrate by spraying or dipping and air dried for approximately 10 to about 15 minutes prior to being subjected to a curing process at approximately 170° C. for approximately 30 minutes.

3 coil springs were coated with Part A solution from Example I (with Part B added as provided in the table above and cured as described above. The coated coils were subjected to a salt spray test according to the ASTM B 117 method. The coating remained adhered to the metal surface after 100 hours, 240 hours and 508 hours of salt spray.

Example IV

| Name of Chemical | Parts by Weight |
| --- | --- |
| Polyester Prepolymer K Flex XMB 3011 | 100.00 |
| Monomer CoatOSil 1770 | 3.00 |
| Surfactant Triton X-100 | 3.00 |
| IrCosperse 2176 | 4.00 |
| D-B Solvent | 5.00 |
| EEP (Ethyl 3-Ethoxypropionate)(Eastman) | 5.00 |
| Rockwood Black Oxide J8105 | 100.00 |
| Strontium Chromate | 10.00 |
| Micronized Talc | 4.00 |
| Anti Corrosive Pigment Shield ex AC5 | 4.00 |
| Halox 430 JM | 4.00 |
| Halox SzP 391 JM | 4.00 |
| Polybutadiene Poly bd 60SE | 80.00 |
| 12% Zirconium Drier | 2.00 |
| 12% Cobalt Drier | .50 |
| Halox 570LS | 40.00 |
| Tint Ayd CW 5317 | 20.00 |
| Phenoxy Prepolymer PKHW35 | 200.00 |
| Melamine Prepolymer Cymel 303 | 74.00 |
| Water | 200.00 |
| Monomer SR 344 | 1.00 |
| Urea Peroxide 1% Solution | 1.00 |
| Silver Perchlorate 0.1% Solution | 1.00 |

The polyester prepolymer, CoatOSil, Triton surfactant, IrCosperse, D-B solvent, EEP and Halox 570LS were mixed for 30 minutes followed by water, the phenoxy prepolymer and remaining components one at a time. After thorough mixing, the mixture was passed through filter cloth and stored at room temperature. Clean metal panels were dipped in the formula of Example IV, air dried for 30 minutes and then the coated metal panel was cured at 170° F. to about 180° F. for 30 to 40 minutes for laboratory testing.

Example V

| Name of Chemical | Parts by Weight |
| --- | --- |
| Deionized Water | 80.00 |
| Epoxy Prepolymer Epirez 3520 WY55 | 250.00 |
| Water dispersed Polyester WD 30 | 170.00 |
| Milling Formulation | 155.00 |
| D.B. Solvent | 65.00 |
| Melamine Prepolymer Cymel 303 | 18.00 |
| Phenolic Prepolymer Santolink EP560 | 185.00 |
| Deionized Water | 60.00 |
| Tint Ayd CW 5317 | 30.00 |
| Fluoro Surfactant FC 4430 2% in Water | 10.00 |
| Monomer CoatOSil 1770 | 0.25 |
| Monomer SR 344 | 0.10 |
| Urea Peroxide 1% Solution | 0.10 |
| Silver Perchlorate 1% Solution | 0.10 |

The milling formulation was first prepared as noted below. To the milling formulation was added the components in the table above in a sequential order one at a time. After thorough mixing, the mixture was passed through filter cloth and stored at room temperature. Clean metal panels were dipped in the formula of Example V, air dried for 30 minutes and then the coated metal panel was cured at 170° F. to about 180° F. for 30 to 40 minutes for laboratory testing.

| Milling Formulation | |
| --- | --- |
| D.B. Solvent | 75.00 |
| Water | 125.00 |
| Anti-Corrosive Pigment Shieldex AC 5 | 40.00 |
| Anti-Corrosive Pigment Halox Z plex | 40.00 |
| Titanium Dioxide 960 W 28 | 4.00 |
| Cab O-Sil HS 5 | 3.00 |
| Mill for 24 Hours | |

The milling formulation was milled for 24 hours on a pebble mill. The milling formulation was used in Example V.

Summary of Sample Identification

| | |
| --- | --- |
| Sample ID: | Coating formulation "Example No. IV" for 96 and 240 hours of salt spray exposure |
| | Coating formulation "Example No. V" for 96 and 240 hours of salt spray exposure |
| Test Specifications: | JDQ 115 - Salt Spray Test for Corrosion Resistance of Paint Films |
| | ASTM D1654 - Standard Test Method for Evaluation of Painted or Coated Specimens Subjected to Corrosive Environments |
| | ASTM B117 - Standard Practice for Operating Salt Spray (Fog) Apparatus |
| | ASTM D714 - Standard Test Method for Evaluating Degree of Blistering of Paints |
| | ASTM D610 - Standard Test Method for Evaluating Degree of Rusting on Painted Steel Surfaces |

Test panels were vertically scribed to the substrate in accordance with ASTM D1654 (JDQ 115). The panels were then subjected to a spray exposure in accordance with ASTM B117 (JDQ 115) for up to 240 hours. The test panels were positioned 15 to 30 degrees from vertical during exposure.

Two panels were removed from exposure following 96 hours, and additional two panels were removed following 240 hours of exposure. Following exposure, the panels were visually evaluated for change. The scribe lines were scraped in accordance with ASTM D1654, Method 2.

The coatings remained adhered to the metal surface after 100 hours and 240 hours of salt spray with no blistering noted and no rust observed.

Evaluations can be found in Tables 1 and 2.

TABLE 1

Salt Spray Test Results Following 96 hours of Exposure

| | Blistering | Scribe Results, mm | | Surface rust rating |
| --- | --- | --- | --- | --- |
| Sample ID | ASTM D714 | Average[1] | Maximum | ASTM D610 |
| Example IV | No blisters observed | 0 | 0 | 10, no rust observed |
| Example V | No blisters observed | 0 | 0 | 10, no rust observed |

[1]An average of 5 readings.

TABLE 2

Salt Spray Test Results Following 240 hours of Exposure

| Sample ID | Blistering ASTM D714 | Scribe Results, mm Average[1] | Maximum | Surface rust rating ASTM D610 |
|---|---|---|---|---|
| Example IV | No blisters observed | 0 | 0 | 10, no rust observed |
| Example V | No blisters observed | 0 | 0 | 10, no rust observed |

[1]An average of 5 readings.

Although the present invention has been described with reference to particular embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A substrate and a coating disposed thereon, wherein the coating comprises:
    a phenoxy resin;
    a melamine;
    an initiator;
    a catalyst;
    a nonionic surfactant;
    a polyester resin; and
    a polybutadiene polyepoxide.

2. The substrate and the coating of claim 1, wherein the phenoxy resin is present from about 18 percent to about 30 percent by weight of the total weight of the composition.

3. The liquid composition of claim 1, wherein the melamine is present from about 5 percent to about 10 percent by weight of the total weight of the composition.

4. The substrate and the coating of claim 1, wherein the initiator is a metal ion selected from the group consisting of ions of iron, silver, cobalt, copper, cerium, and combinations thereof.

5. The substrate and the coating of claim 1, wherein the catalyst is present from about 0.01 percent to about 1.0 percent by weight of the total weight of the composition.

6. The substrate and the coating of claim 1, wherein the nonionic surfactant is present from about 0.1 percent to about 5 percent by weight of the total weight of the composition.

7. The substrate and the coating of claim 1, wherein the polyester resin is present from about 8 percent to about 20 percent by weight of the total weight of the composition.

8. The substrate and the coating of claim 1, wherein the polybutadiene polyepoxide is present from about 6 percent to about 20 percent by weight of the total weight of the composition.

9. The substrate and the coating of claim 1, further comprising an epoxy silane wherein the epoxy silane is present from about 0.01 percent to about 2 percent by weight of the total weight of the composition.

10. The substrate and the coating of claim 1, wherein the substrate is one of iron, copper, brass, aluminum, silver, or steel.

11. The substrate and the coating of claim 1, further comprising one or more of an alkenylsuccinic anhydride, a magnesium silicate, a silica, a zinc phosphate complex, a phosphosilicate, black iron oxide, a cobalt carboxylate, a zirconium carboxylate, or a polyethylene glycol diacrylate.

12. The substrate and coating of claim 1, wherein the catalyst is a urea peroxide and the initiator is silver perchlorate ($AgClO_4$), silver nitrate ($AgNO_3$) or ferrous ammonium sulfate ($(NH_4)_2Fe(SO_4)_2$).

13. The substrate and coating of claim 11, further comprising one or both of ethyl 3-ethoxypropionate and diethylene glycol monobutyl ether.

14. The substrate and the coating of claim 1, wherein the phenoxy resin is present from about 18 percent to about 30 percent by weight of the total weight of the composition, wherein the melamine is present from about 5 percent to about 10 percent by weight of the total weight of the composition, the catalyst is present from about 0.01 percent to about 1.0 percent by weight of the total weight of the composition, the nonionic surfactant is present from about 0.1 percent to about 5 percent by weight of the total weight of the composition, the polyester resin is present from about 8 percent to about 20 percent by weight of the total weight of the composition, and the polybutadiene polyepoxide is present from about 6 percent to about 20 percent by weight of the total weight of the composition.

15. The substrate and the coating of claim 14, wherein substrate is one of iron, copper, brass, aluminum, silver, or steel.

16. The substrate and the coating of claim 14, wherein the catalyst is a urea peroxide and the initiator is silver perchlorate ($AgClO_4$), silver nitrate ($AgNO_3$) or ferrous ammonium sulfate ($(NH_4)_2Fe(SO_4)_2$).

17. The substrate and the coating of claim 14, further comprising one or more of an epoxy silane, an alkenylsuccinic anhydride, a magnesium silicate, a silica, a zinc phosphate complex, a phosphosilicate, black iron oxide, a cobalt carboxylate, a zirconium carboxylate, or a polyethylene glycol diacrylate.

18. The substrate and coating of claim 17, further comprising one or both of ethyl 3-ethoxypropionate and diethylene glycol monobutyl ether.

19. The substrate and the coating of claim 10, wherein the catalyst is a urea peroxide, the initiator is silver perchlorate ($AgClO_4$), silver nitrate ($AgNO_3$) or ferrous ammonium sulfate ($(NH_4)_2Fe(SO_4)_2$), further comprising one or more of an alkenylsuccinic anhydride, a magnesium silicate, a silica, a zinc phosphate complex, a phosphosilicate, black iron oxide, a cobalt carboxylate, a zirconium carboxylate, a polyethylene glycol diacrylate, ethyl 3-ethoxypropionate or diethylene glycol monobutyl ether.

20. The substrate and the coating of claim 14, wherein the catalyst is a urea peroxide, the initiator is silver perchlorate ($AgClO_4$), silver nitrate ($AgNO_3$) or ferrous ammonium sulfate ($(NH_4)_2Fe(SO_4)_2$), further comprising one or more of an epoxy silane, an alkenylsuccinic anhydride, a magnesium silicate, a silica, a zinc phosphate complex, a phosphosilicate, black iron oxide, a cobalt carboxylate, a zirconium carboxylate, a polyethylene glycol diacrylate, ethyl 3-ethoxypropionate or diethylene glycol monobutyl ether.

* * * * *